(12) United States Patent
Jeanguillaume

(10) Patent No.: US 8,675,791 B2
(45) Date of Patent: Mar. 18, 2014

(54) METHOD AND AN APPARATUS FOR DECONVOLUTING A NOISY MEASURED SIGNAL OBTAINED FROM A SENSOR DEVICE

(75) Inventor: Christian Jeanguillaume, Bouchaine (FR)

(73) Assignee: Universite d'Angers, Angers Cedex (FR) (FR)

( * ) Notice: Subject to any disclaimer, the term of this patent is extended or adjusted under 35 U.S.C. 154(b) by 87 days.

(21) Appl. No.: 13/144,009

(22) PCT Filed: Jan. 9, 2009

(86) PCT No.: PCT/IB2009/006000
§ 371 (c)(1),
(2), (4) Date: Oct. 11, 2011

(87) PCT Pub. No.: WO2010/079377
PCT Pub. Date: Jul. 15, 2010

(65) Prior Publication Data
US 2012/0020442 A1 Jan. 26, 2012

(51) Int. Cl.
*H03D 1/04* (2006.01)

(52) U.S. Cl.
USPC ........... 375/346; 375/260; 375/262; 375/265; 375/267; 375/295; 375/316; 375/343; 375/347; 375/350

(58) Field of Classification Search
USPC ......... 375/346, 260, 262, 265, 267, 285, 295, 375/316, 340, 343, 347; 327/310, 384, 551; 348/607; 455/296
See application file for complete search history.

(56) References Cited

U.S. PATENT DOCUMENTS 5,852,630 A * 12/1998 Langberg et al. ............. 375/219
6,266,003 B1 * 7/2001 Hoek ............................ 341/155

OTHER PUBLICATIONS

Written Opinion of the International Searching Authority for PCT/IB2009/006000, mailed Nov. 6, 2009.
Jeanguillaume, C. et al., "Minimum deconvolution and 0-90° subset, new algorithms for emission tomography with large hole collimator", Nuclear Science Symposium Conference Record, (Oct. 1, 2007), pp. 3718-3719.
Preis, D. et al., "Envelope-constrained time-domain deconvolution for transversal-filter equalizers", Electronics Letters, vol. 14, No. 2, (1978), pp. 37-38.
Berenstein, C.A. et al., "Exact Deconvolution for Multiple Convolution Operators-An Overview, plus Performance Characterizations for Imaging Sensors", Proceedings of the IEEE, vol. 78, No. 4, (Apr. 1, 1990), pp. 723-724.
Hogbom, J.A., "Aperture Synthesis with a Non-Regular Distribution of Interferometer Baselines", Astronomy and Astrophysics, vol. 15, No. 3, (Jan. 1, 1974), pp. 417-426.

* cited by examiner

*Primary Examiner* — Dhaval Patel
(74) *Attorney, Agent, or Firm* — Nixon & Vanderhye, PC

(57) ABSTRACT

The present invention relates to a method and apparatus for deconvolving a noisy measured signal obtained from a sensor device (100), said noisy measured signal (y(t)) being the sum of the convolution product $(x(t) \otimes N(t))$ of an input signal (x(t)) of the sensor device, representative of a feature of physical quantity, by a convolution kernel (N(t)) defined by the response function of the sensor device (100) and a noise which interfere with the measure. The method is characterized in that said method comprises an estimate computation step (400) in the course of which a minimal estimate $(x_{min}(t) \otimes N(t))$ of the convolution product of the input signal by the convolution kernel of the sensor device is computed in order that said minimal estimate stays below the noisy measured signal (y(t)) and has at least one point in common with the noisy measured signal (y(t)).

13 Claims, 12 Drawing Sheets

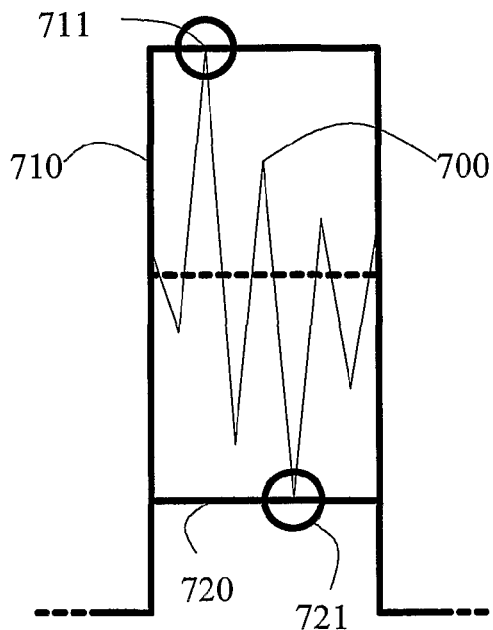
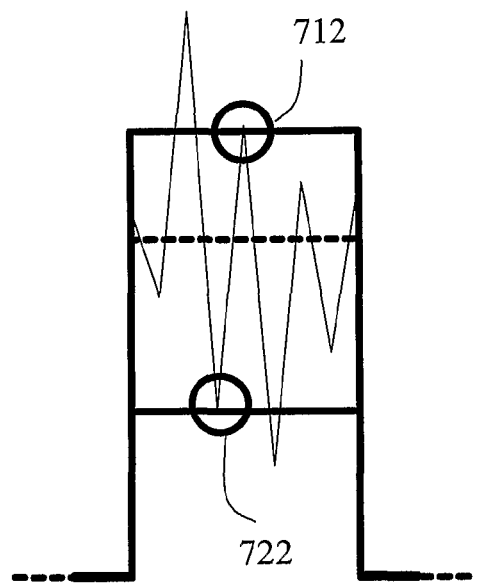
Fig. 7a
Fig. 7b
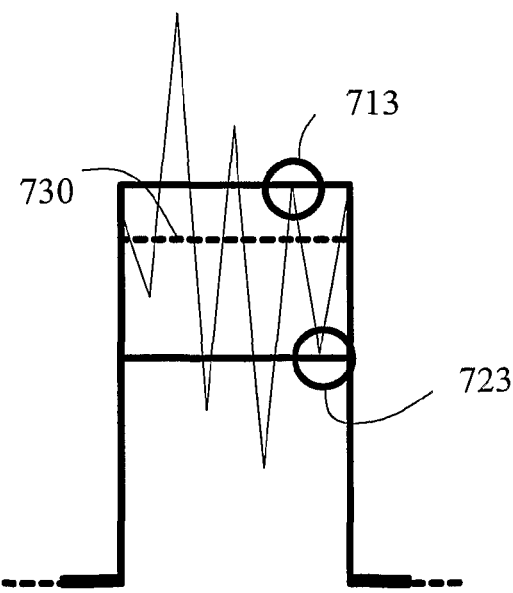
Fig. 7c

| 0 | 0 | 3 | 3 | 3 | 3 | 3 | 3 | 3 |
| 0 | 3 | 3 | 3 | 3 | 3 | 3 | 3 | 0 |
| 3 | 3 | 3 | 3 | 3 | 3 | 3 | 0 | 0 | 800

| 3 | 6 | 9 | 9 | 9 | 9 | 9 | 6 | 3 | 810

METHOD AND AN APPARATUS FOR DECONVOLUTING A NOISY MEASURED SIGNAL OBTAINED FROM A SENSOR DEVICE

This application is the U.S. national phase of International Application No. PCT/IB2009/006000, filed 9 Jan. 2009, which designated the U.S., the entire contents of which is hereby incorporated by reference.

The present invention relates to a method and an apparatus for deconvoluting a noisy measured signal obtained from a sensor device, said measured signal being the sum of the convolution product of an input signal of the sensor device, representative of a feature of physical quantity, by a convolution kernel defined by the response function of the sensor device and a noise which interfere with the measure.

In various physical domains, such as in astronomy, optical satellite, astronomical imaging, or in medicine for example, an acquisition system is used for generating a signal representative of a feature of a physical quantity.

Figure 1:
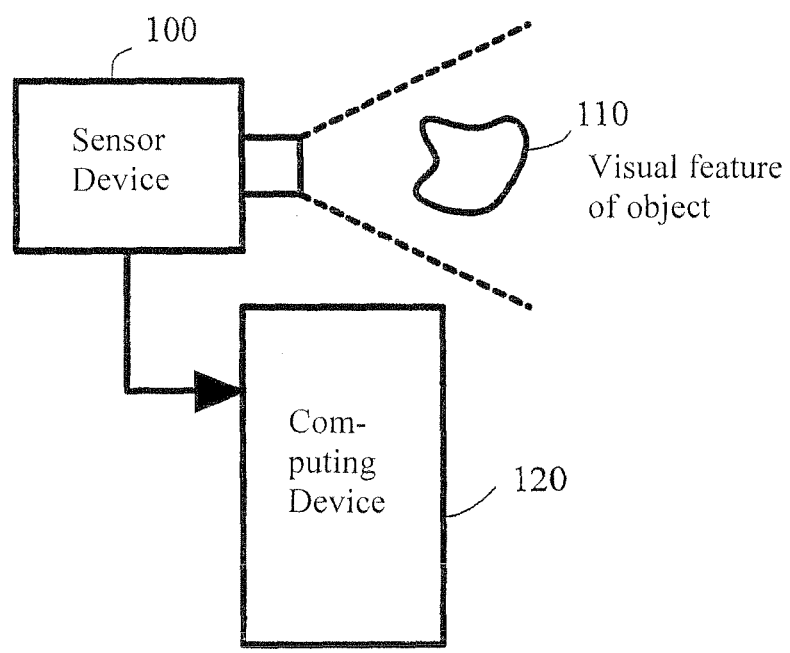

Such acquisition systems may be represented schematically as comprising a sensor device 100 intended to generate a signal y(t) and a computing device 120 intended to apply some processing on that generated signal as illustrated in FIG. 1.

It is usual to consider the generated signal, called the noisy measured signal y(t) in the following, to be a convolution product of two separate signal functions given by $$y(t) = \int_{-\infty}^{\infty} x(\tau) \cdot N(t-\tau) d\tau = x(t) \otimes N(t) \tag{1}$$

where x(t) is the sought signal, called in the following the input signal, representing the feature of a physical quantity, such as a visual feature of an object 110 as shown in FIG. 1 for illustrative purpose, and N(t) is the response function also called the point spread function of the sensor device 100. In mathematics, N(t) is called the convolution kernel of the sensor device 100.

Nowadays in practical applications, the signals are digitalised. The noisy measured signal y(t) may be a digital signal represented by a m-length vector Y, called a noisy measured vector in the following, or a digitalised version of a continuous (in time for example) signal. In the following both the noisy measured signal y(t) and the in-length noisy measured vector Y are considered because the deconvolution method of the present invention may be implemented using an apparatus which comprises either analogous or digital means.

The noisy measured vector Y may be obtained directly from a one-dimensional digital or digitalised noisy measured signal. But the noisy measured vector Y may also be obtained from a two-dimensional digital or digitalised image, by concatenating successively the different lines of the digital image or a digitalised version of it. By extension, any sensor device 100 which generates multidimensional digital signal or a digitalised version of it which can be represented by a vector of components may be considered as a noisy measured vector Y.

Therefore the convolution product between the input signal and the convolution kernel is replaced by a sum of a finite number of terms. It needs to take at each point all the points of the convolution kernel. For that, the convolution kernel is usually represented by a Toeplitz matrix where each column gives all the values of the convolution kernel, and from one column to the next all the values are shifted by one row lower to fit every point in the input signal.

The convolution product is then a vector matrix product given by $$Y = X \cdot N \tag{2}$$

where X is a n-length vector comprising the values of a digitalized version of the input signal x(t), called in the following the input vector, and N is a digitalised version of the convolution kernel N(t) expressed in a Toeplitz matrix form.

Deconvoluting the noisy measured vector Y is usually used in physics for determining an estimate of the input vector X, i.e. an estimate of an observed feature of a physical quantity, from the noisy measured vector Y.

Theoretically and in the absence of noise, the deconvolution is an easy process. Considering the convolution product in equation (2), one can either periodize the problem and use either a square (circulant) matrix that may be inverted by Fourier transform, or a Truncated Singular Value Decomposition (TSVD).

But in the presence of noise, i.e. when the convolution product is given by $$Y = X \cdot N + \text{no} \tag{3}$$

where no represents a noise, the results are awkward as illustrated by the simulation given in FIG. 2a-2d.

Figure 2A:
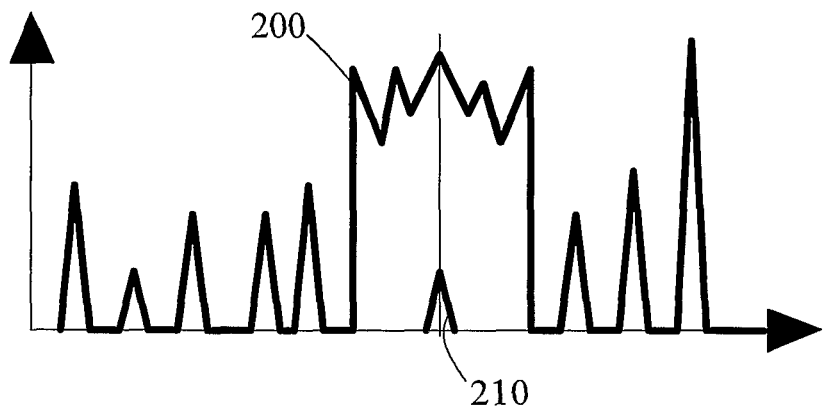

FIG. 2a shows an example of a noisy measured signal 200 obtained by the convolution of a simple Dirac 210 (input signal) by a rectangle function convolution kernel. The noise no is composed of a Poisson noise plus a detector noise (dark current). The noise no is simulated by some randomly distributed impulses.

Figure 2B:
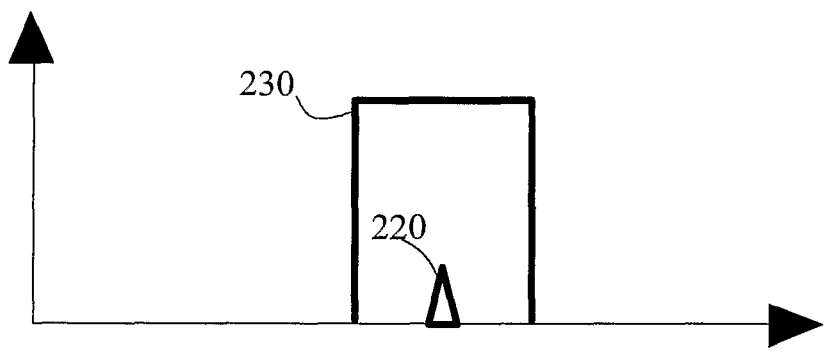

FIG. 2b shows what is the expected signal 220 resulting of the deconvolution of the noisy measured signal 200 by a rectangle function 230 of a correct shape. In fact, ideally, the expected signal 220 is a null function except at the location of the Dirac function 210. This result would allow a very good performance of the deconvoluting method.

Figure 2C:

However, in practice the resulting signal of the deconvolution of the noisy measured signal 200 by the rectangle function 230 with the TSVD is awkward as shown is FIG. 2c.

Figure 2D:
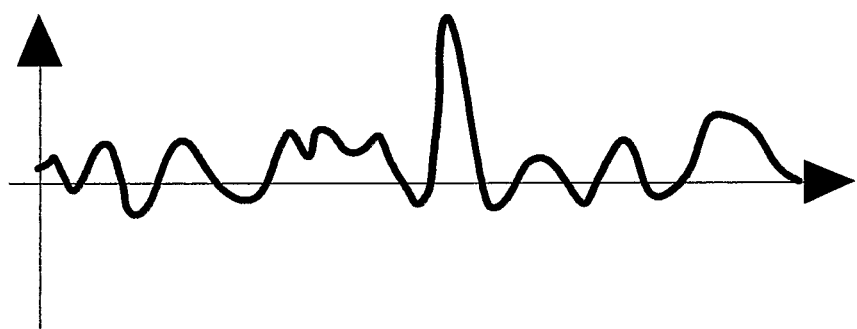

Note that any approaches with a strong smoothing component, like the Wiener filter or the hunt approach for example, cannot recover the Dirac function 210 at the precise location, because the contrast of such function is hampered by the involved smoothing process as shown in FIG. 2d. Therefore, the exact location and the contrast of the input signal are badly recovered with such regularised techniques.

In astronomy, another approach consists of considering the input signal as being composed exclusively of a sum of Dirac functions. This approach has, for example, been used in the CLEAN algorithm (Högbom, J. (1974), "Aperture synthesis with a non-regular distribution of interferometer baselines", *Astrophys. J. Suppl. Ser.*, 15, 417-426., and Clark, B. G. (1980), "An efficient implementation of the algorithm 'CLEAN'", *Astron. Astrophys.*, 89, 377-378.). Although the CLEAN algorithm gives good deconvoluting results in simple cases, it is less ubiquitous that the invention presented in the following gives poor results in more complex type of input signal.

The technical problem solved by the invention is to get an estimate with a very high signal to noise ratio of an input signal from a noisy measured signal given by a sensor device. The noisy measured signal presents a noisy detection due to Poisson noise for example in optical measurement, but the noisy measured signal can also be deteriorated by detector noise, example of it is the dark current. Therefore the noisy measured signal can be represented by the sum of the convolution product of the noisy input signal by a convolution kernel defined from the response function of said sensor device. The convolution kernel is assumed to be a priori known.

This technical problem is encountered by lot of applications in physics. In the following, some examples of applications are listed in a non-exhaustive manner in order to show the broad scope of the invention.

Figure 3:
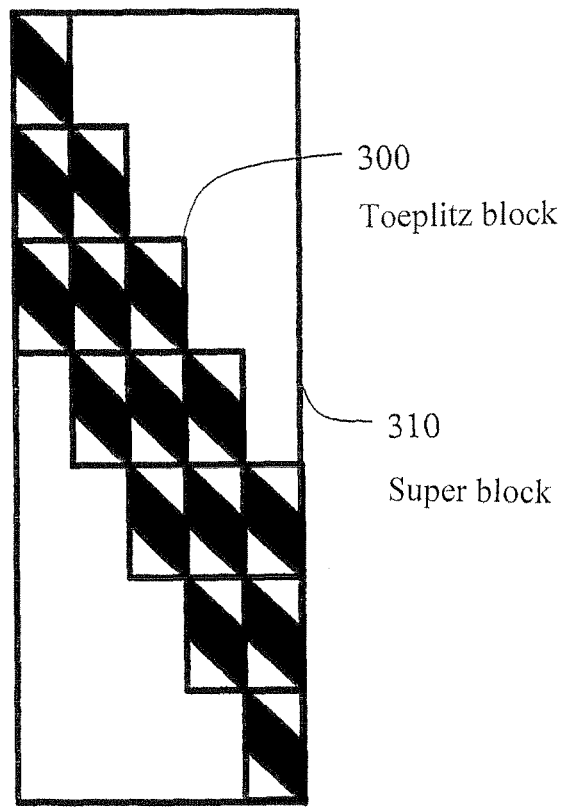

In the optical imaging for example, the sensor device can be a CCD array (US 2007/0036461 or U.S. Pat. No. 5,111, 515), the input signal is then a true focused image, the noisy measured signal is a defocused and blurred image, and the convolution kernel can be calculated by the Hopkins or Stokseth formulae, depending on the required accuracy. The Toeplitz matrix N corresponds to a two-dimensional kernel an example of which is shown in FIG. 3 where each column of blocks 300 corresponds to a line of the noisy measured image and each row of blocks 300 corresponds to a line of the input image.

In confocal microscopy, a similar technical problem is also encountered (U.S. Pat. No. 6,166,853). The noisy measured signal is recorded by a CCD detector, the kernel is given by the Point Spread Function (PSF) of the microscope giving in this case a three-dimensional response function (x,y,z), that can be modelized by a three-dimensional Toeplitz matrix, where two-dimensional matrices replace the elementary Toeplitz matrices to give super block structure. Referring to the example of FIG. 3, each Toeplitz block 300 is replaced by a complete super block 310.

In the U.S. Pat. No. 5,862,269, a two-dimensional kernel is also given by the point spread function of the apparatus, the noisy measured signal (dirty beam in this patent), is recorded by a detector of any kind. The input signal is the image which is looking for, called the clean beam in this patent.

In satellite and astronomical imaging where visible image and either Infra-Red or Micro Wave images are used, a similar technical problem is encountered (US 2007/0003155). In the same way, as described previously, a detector (CCD or CMOS or Shack-Hartmann sensor) gives a blurred image (dirty beam). The point spread function which blurs this image is calculated by the Kolmogorov formulae, a measure can also be performed by laser. Then the true image is calculated by deconvoluting the noisy measured signal given by the sensor. For that, different approaches are proposed like the Wiener filter and the Richardson and Lucy algorithm. As previously said, the Wiener approach introduces a smoothing component which degrades the resolution of the signal resulting from the deconvolution. Moreover, the Richardson and Lucy algorithm is an iterative method which is very slow, and which introduces a blur effect. In this patent, blind deconvolution algorithm are also proposed when the kernel of the deconvolution is unknown. These algorithms in fact use repeatedly, normal 'unblind' deconvolution algorithm with a guessed kernel, which is iteratively corrected.

Note that this patent discloses the use of more than one noisy measured signal (IR, visible, microwave, or several defocused visible images) corresponding to the same input signal in a process called multichannel deconvolution (C. Berenstein, "Exact deconvolution for multiple convolution operators", Proc. IEEE 1990, 78, p. 723-734).

In medical application or elsewhere for industrial or other applications in which the sensor device uses gamma ray, a similar technical problem is encountered (U.S. Pat. No. 5,825,033). The ideal image, e.g. the exact location of the radio active material in the body of the patient for medical application, or elsewhere for industrial or other applications, is convoluted (blurred) by diverse effect: among them is the Compton scattering, in the patient body and in the collimator, then scattering in the detector, the point spread function of the detector play also a role. In this application, the detector is of the semiconductor type (CdTe or CdZnTe) to recover the ideal image of the localization of the radio-active sources. An example of kernel due to the Compton scattering, can be found in X. Wang and KF Koral, IEEE Transactions on Medical Imaging, vol. 11, N° 3 Sep. 1992, PP. 351-360.

The inventor observed that in those applications of well-known deconvoluting methods, the noisy measured signal admits a minimal estimate formed by a positive convolution product which has non zero components only on the exact place at the noise free convoluted signal. Thus, rather than computing an estimate of the input signal by minimising the deviation between a noisy measured signal and the convolution product of the input signal by the convolution kernel of the sensor device 100, as proposed by the known deconvoluting methods, the inventor proposes to compute a minimal estimate of the convolution product of an input signal by the convolution kernel of the sensor device 100, under the constraint that the estimate of said convolution product stays below the noisy measured signal and has at least one point in common with the noisy measured signal.

This principle for estimating, from the noisy measured signal, a convolution product, from which the input signal is deduced, allows to localize the input signal, having a Dirac shape, from the noisy measured signal more precisely than using minimum distance criterium of the prior art. Then, the deconvoluting method according to the invention improves the signal to noise ratio of the final estimate of the input signal compared to the signal to noise ratio obtained by the well-known deconvoluting methods.

Indeed, the present invention relates to a deconvoluting method which comprises an estimate computation step in the course of which a minimal estimate of the convolution product of the input signal by the convolution kernel of the sensor device is computed in order that said minimal estimate stays below the noisy measured signal and has at least one point in common with the noisy measured signal.

This improves the signal to noise ratio of the estimated input signal because the estimated convolution product is precisely localised.

However, the inventor observed that the signal to noise ratio could be improved by computing also a maximal estimate of the convolution product.

According to an embodiment of the method, in the course of the estimate computation step, a maximal estimate of the convolution product of the input signal by the convolution kernel of the sensor device is also computed in order that this maximal estimate stays above the noisy measured signal and has at least one point in common with the noisy measured signal.

Then, computing both the minimal and maximal estimates allows to frame the final estimate of the convolution product of the input signal by the convolution kernel of the sensor device.

According to an embodiment of the method, said final convolution product is the average of said minimal and maximal estimates.

The final estimate of the input signal deduced from the average of the minimal and maximal estimates of the convolution product may have an amplitude which is quite far from the amplitude of the input signal.

The inventor has observed that the noisy measured signal has some isolated peaks which are most often relative to main components of the additive noise.

Thus, the inventor proposes that in order to get an amplitude closer to the amplitude of the input signal, i.e. to improve the signal to noise ratio of the final estimate of the input signal, the minimal and maximal estimate of the convolution product shall be iteratively computed.

In that case, the method comprises a contact point detection step in the course of which at least one point in common, called contact point, between the measured signal and the minimal estimate of the convolution product and at least one point in common, also called contact point, between the measured signal and the maximal estimate of the convolution product are detected.

The method is then iterated until a criteria is verified. At each iteration, another minimal estimate and another maximal estimate by going beyond at least some of previously detected contact points, and to detect at least one new contact point relative to said another minimal estimate and at least one new contact point relative to said another maximal estimate.

According to another aspect, the present invention relates to an apparatus which comprises means for implementing such a deconvoluting method.

According to still another aspect, the present invention concerns computer programs which can be directly loadable into a programmable apparatus, comprising instructions or portions of code for implementing the steps of the methods according to the invention, when said computer programs are executed on a programmable apparatus.

Since the features and advantages relating to the computer programs are the same as those set out above related to the methods and apparatus according to the invention, they will not be repeated here.

The characteristics of the invention will emerge more clearly from a reading of the following description of an example embodiment, the said description being produced with reference to the accompanying drawings, among which:

FIG. 1 represents schematically an acquisition system which comprises a sensor device, FIG. 2*a-d* represent an illustration of the deconvolution of a one-dimensional noisy measured signal, FIG. 3 represents schematically a block Toeplitz matrix relative to a two dimensional kernel.

Figure 4:
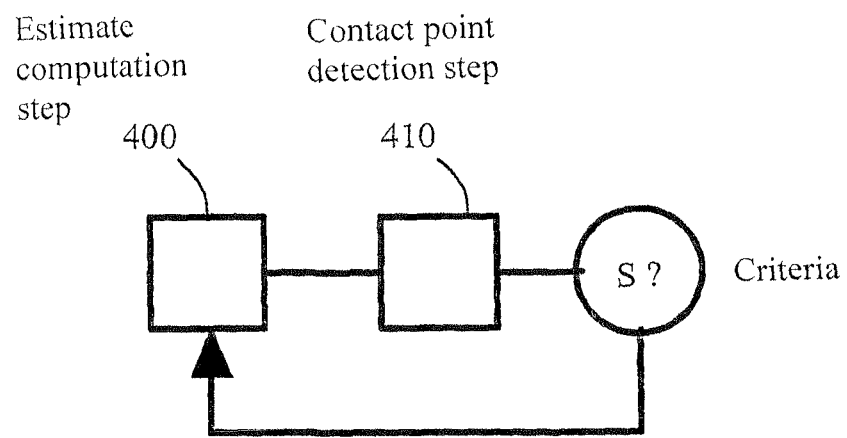
Figure 5A:
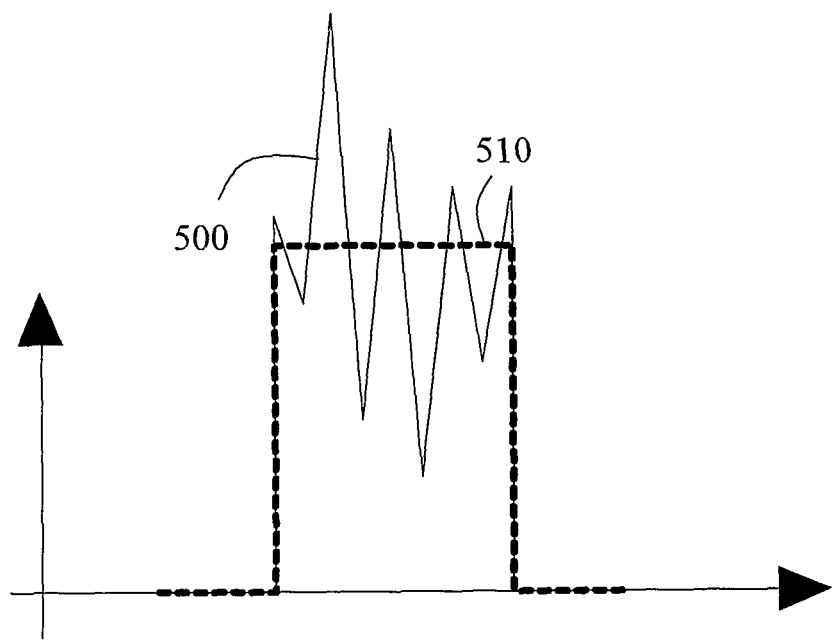
Figure 5B:
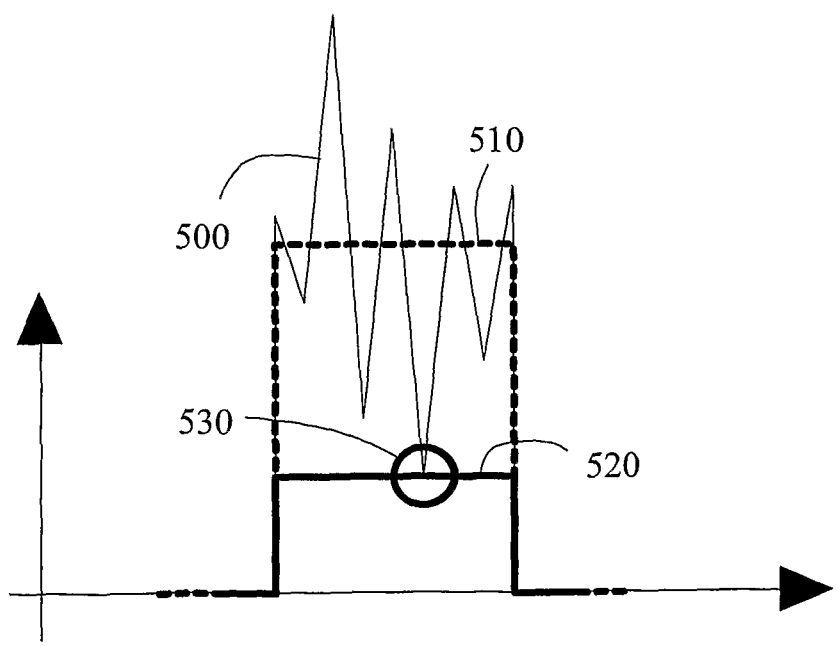
Figure 6:
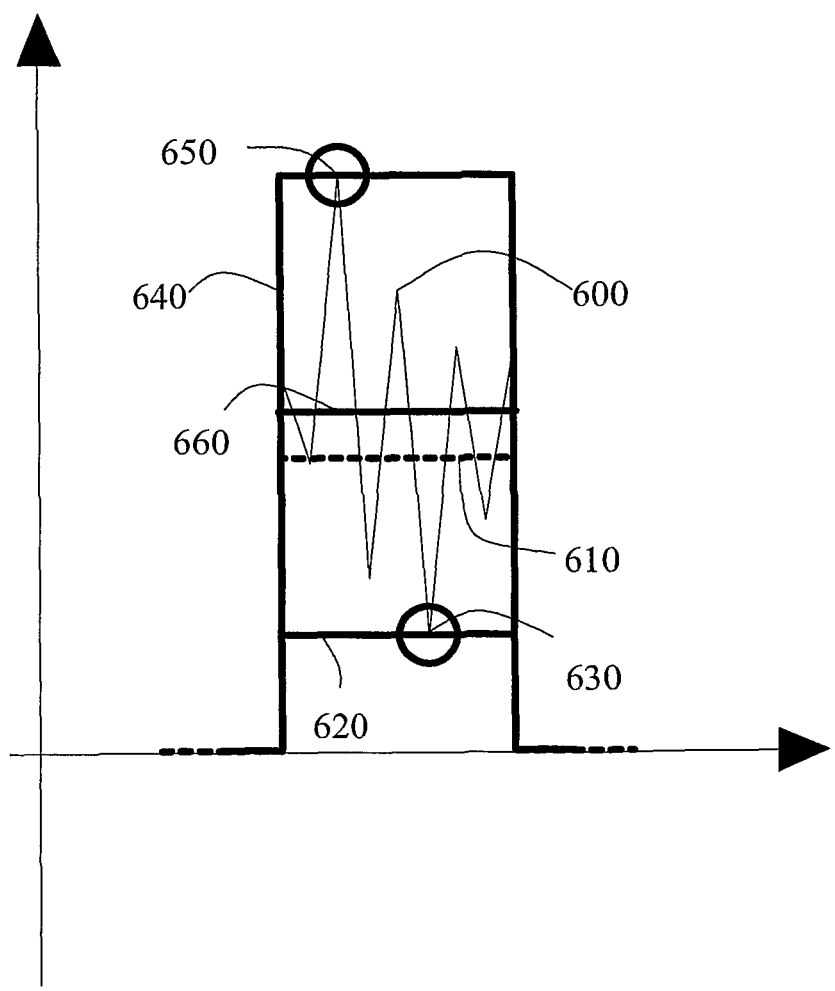
Figures 8A, 8B, 8C:
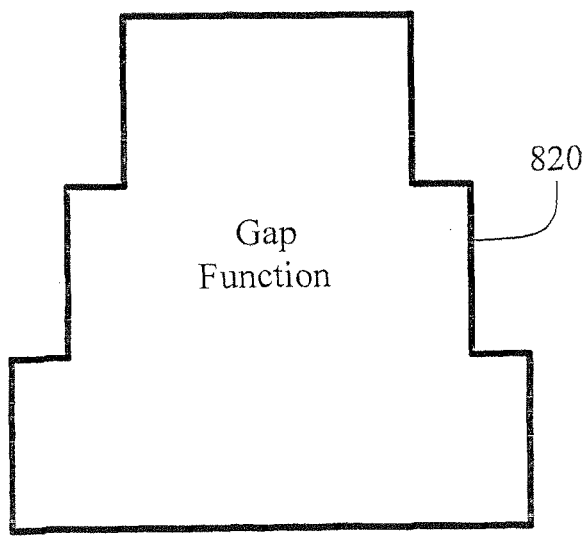
Figure 9:
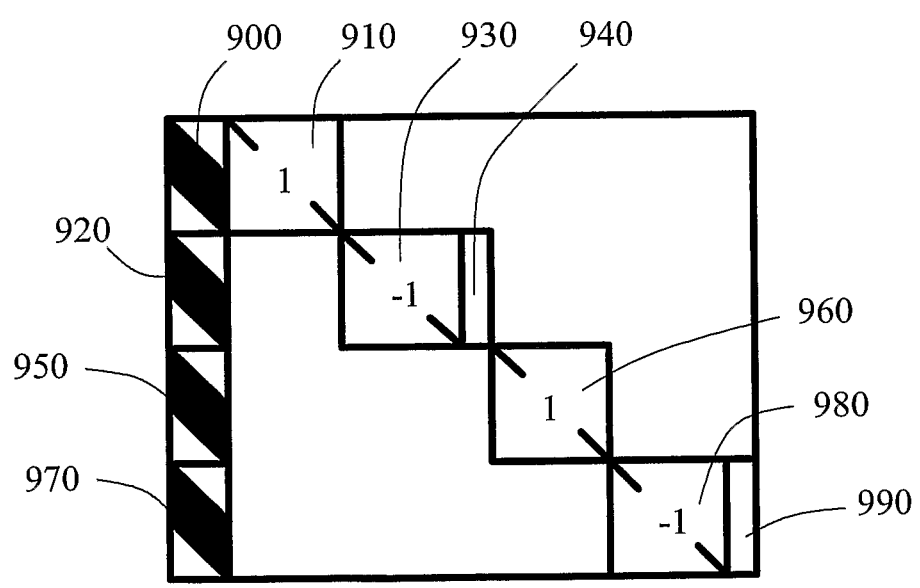
Figure 10:
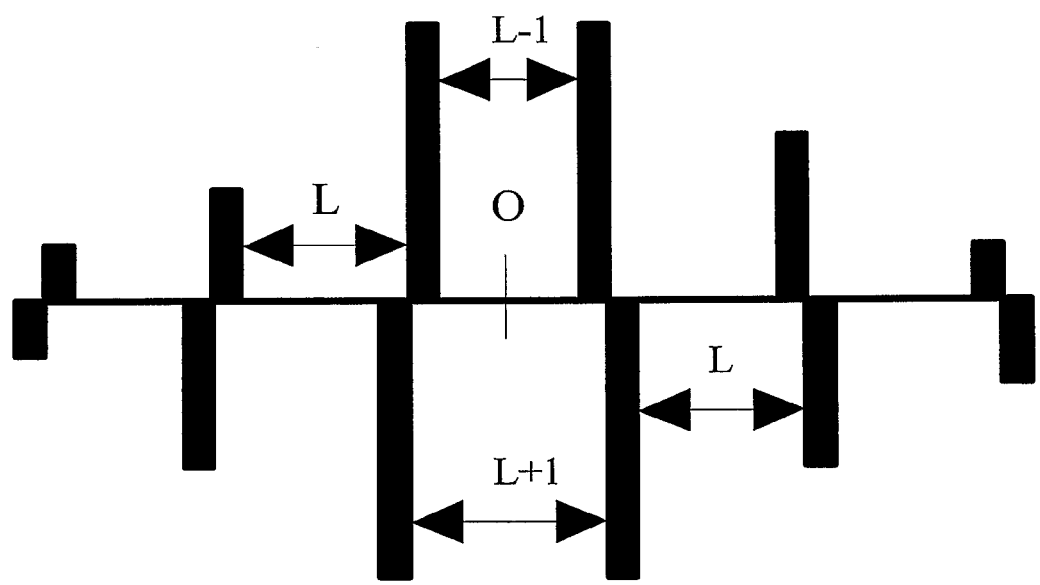
Figure 11:
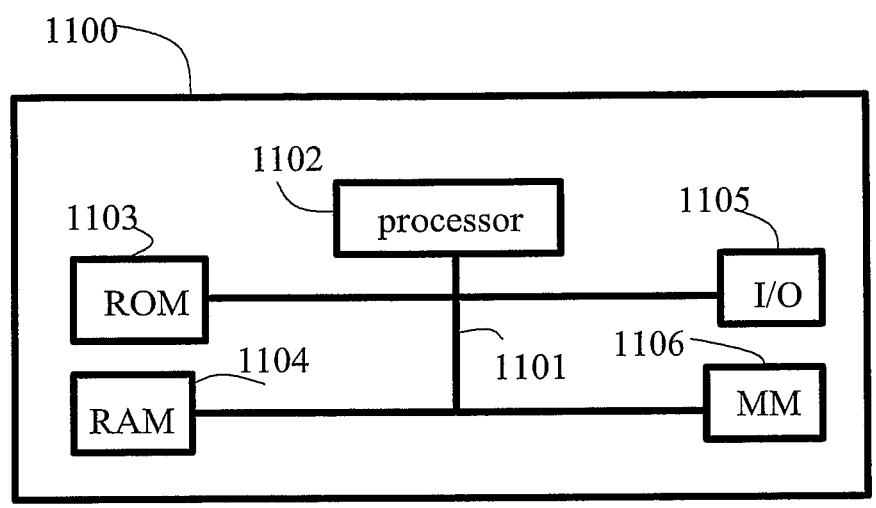

FIG. 4 is a flow chart of the deconvolution method according to the present invention, FIG. 5*a-b* represent schematically the result obtained by the computation of a minimal estimate of the convolution product, FIG. 6 represents schematically the result obtained by the computation of a minimal and a maximal estimate of the convolution product, FIGS. 7*a* to 7*c* illustrate the iterative deconvolution method when the convolution kernel is a one-dimensional rectangular function and the input signal is a Dirac function, FIG. 8*a-c* illustrate an example for defining the gap function from the Toeplitz matrix of the convolution problem, FIG. 9 illustrates an example of the form of the constraint matrix when a multichannel technique is included in the constrained linear system, FIG. 10 shows a typical inverse filter built from a rectangle kernel of width L, and FIG. 11 is a diagram representing the architecture of an apparatus in which the present invention is implemented.

In FIG. 4 is represented a flow chart of the deconvolution method according to the present invention.

The method for deconvoluting the noisy measured signal y(t) obtained from a sensor device 100 as described in FIG. 1 includes an estimate computation step 400 in the course of which a minimal estimate $x_{min}(t) \otimes N(t)$ of the convolution product is computed, where $x_{min}(t)$ is the minimal estimate of the input signal x(t), in order that this minimal estimate stays below the noisy measured signal y(t) and has at least one point in common with the noisy measured signal.

In FIG. 5*a-b*, the minimal estimate of a convolution product $x_{min}(t) \otimes N(t)$ is shown for illustrative purpose. In this example, the input signal is a Dirac function and the convolution kernel is a rectangular function. FIG. 5*a* represents the noisy measured signal 500 and the ideal convolution product 510 (dashed lines) which is expected to be retrieved from the noisy measured signal 500. The minimal estimate of the convolution product $x_{min}(t) \otimes N(t)$, labelled 520, as shown in FIG. 5*b*, is below the noisy measured signal 500 and has a point 530 in common with it.

According to an embodiment of the step 400, the minimal estimate of the convolution product $x_{min}(t) \otimes N(t)$ under the above-mentioned constraints is computed by optimising a constrained linear system which contains at least the following constraints $$\begin{cases} \text{Minimize } u(t) = y(t) - x_{min}(t) \otimes N(t) \\ \quad \text{subject to } u(t) \geq 0 \text{ and} \\ \quad \quad x_{min}(t) \geq 0 \end{cases} \quad (4)$$

where u(t) is the deviation between the minimal convolution product and the noisy measured signal y(t).

It is well-known that such a constrained linear system, once digitalized, can be solved by using a simplex method or an interior point method.

Generally speaking, a simplex or interior point method can be applied when the constrained linear system is expressed by $$\text{Minimize } CZ \text{ subject to } AZ=B \text{ and } Z \geq 0 \quad (5)$$

where Z is a vector, the components of which shall be computed, C is a cost vector and AZ=B is the equalities constraints in which A is a constraint matrix. Moreover, the constraint $Z \geq 0$ means that each component of Z is positive.

In the following, $X_{min}$, called a minimal input vector, is a digitalised version of the minimal estimate $x_{min}(t)$ of the input signal, and N is a Toeplitz matrix which is defined from a digitalised version of the convolution kernel N(t). The minimal estimate of the convolution product $x_{min}(t) \otimes N(t)$ is then a vector matrix product $X_{min} \cdot N$ between a minimal input vector $X_{min}$ and the Toeplitz matrix N. Note that such a minimal estimate of the convolution product is constrained to be an exact convolution product of positive vectors, i.e. $X_{min} \cdot N$ where all the non zero components of $X_{min}$ are positive values.

The vector B of the constrained linear system of equation (5) is a m-length vector the components of which are equal to the components of the noisy measured vector Y.

The vector Z of the constrained linear system of equation (5) is a (n+m)-length vector the first n components of which are the n components of the minimal input vector $X_{min}$, the m following components of which are the m components of a deviation vector U the components of which are the deviations between the minimal estimate of the convolution product $X_{min} \cdot N$ and the noisy measured vector Y.

The cost vector C is chosen to minimize the deviation vector U. The cost vector C is then a (n+m)-length vector the first n components being equal to 0, the other components being equal to 1.

Optimising such a constrained linear system allows the minimization of the deviation vector U and insures that at least one component of the deviation vector U is equal to 0 after such an optimisation.

The constrained linear system A·Z=B is then given by $$[N \quad I_1] \begin{bmatrix} X_{min} \\ U \end{bmatrix} = Y \quad (5)$$

where $I_1$ is the identity matrix.

According to an embodiment of the method, in the course of the step 400 a maximal estimate of the convolution product $x_{max}(t) \otimes N(t)$, where $x_{max}(t)$ is the maximal estimate of the input signal x(t), is also computed in order that this maximal estimate stays above the noisy measured signal y(t) and has at least one point in common with the noisy measured signal.

Then, computing both the minimal and maximal estimates of the convolution product frame the sought convolution product.

According to an embodiment of the step 400 relative to this embodiment of the method, the minimal and maximal estimates of the convolution product $x(t) \otimes N(t)$ under the above-mentioned constraints are computed by optimising a constrained linear system which contains at least the following constraints $$\begin{cases} \text{Minimize } u(t) = y(t) - x_{min}(t) \otimes N(t) \\ v(t) = x_{max}(t) \otimes N(t) - y(t) \\ u(t) \geq 0 \text{ and } v(t) \geq 0 \text{ and} \\ x_{min}(t) \geq 0 \text{ and } x_{max}(t) \geq 0 \end{cases}$$

where u(t) is the deviation between the minimal convolution product and the noisy measured signal y(t) and v(t) is the deviation between the maximal estimate of the convolution product and the noisy measured signal y(t).

Note that usually in physics, only positive estimates of the input signal have physical meaning. This is expressed in the constrained linear system by constraining $x_{min}(t)$ and $x_{max}(t)$ to remain positive values.

In FIG. 6, the minimal and maximal estimates of a convolution product are shown for illustrative purpose. In this example, the input signal is a Dirac function and the convolution kernel is a rectangular function. The ideal convolution product which is expected to be retrieved from the noisy measured signal 600 is the convolution product 610 in dashed line. The minimal estimate 620 of the convolution product 610 is below the noisy measured signal 600 and has a point 630 in common with it, and the maximal estimate 640 of the convolution product 610 is above the noisy measured signal 600 and has a point 650 in common with it.

According to a variant, the gap separating said minimal and maximal estimates of the convolution product is preferably represented by a weighted gap function $w \cdot \psi(t)$ where w is a positive scalar value, called a weighted coefficient, which measures the distance between the minimal and maximal estimates of the convolution product. This guarantees the convergence of these two estimates towards the sought convolution product.

Then, the maximal estimate of the convolution product is deduced from the minimal estimate of the convolution product by the following relation $$x_{max}(t) \otimes N(t) = x_{min}(t) \otimes N(t) + w \cdot \psi(t)$$

and the constrained linear system contains at least the following constraints $$\begin{cases} \text{Minimize } u(t) = y(t) - x_{min}(t) \otimes N(t) \text{ and} \\ v(t) = x_{min}(t) \otimes N(t) + w \cdot \psi(t) - y(t) \text{ and} \\ w \\ \text{subject to } u(t) \geq 0, v(t) \geq 0, w \geq 0 \text{ and} \\ x_{min}(t) \geq 0 \end{cases} \quad (6)$$

According to an embodiment of the method, illustrated in FIG. 6, the final estimate 660 of the convolution product 610, from which an estimate of the input signal is deduced is the average of a minimal and a maximal estimate 620 and 640 of the convolution product.

Referring to FIG. 6, the final estimate 660 of the convolution product 610 is the average of the computed minimal and maximal estimates 620 and 640.

Introducing a smoothing constraint avoids that the deconvolution method produces estimates that oscillate dramatically in very noisy conditions.

When a smoothing constraint is introduced on the minimal and maximal estimates, the constrained linear system contains then at least the following constraints $$\begin{cases} \text{Minimize } u(t) = y(t) - x_{min}(t) \otimes N(t) \text{ and} \\ v(t) = x_{min}(t) \otimes N(t) + w \cdot \psi(t) - y(t) \text{ and} \\ \int \left| \frac{\partial x_{min}(t)}{\partial t} \right| dt \text{ or } \int \left| \frac{\partial^2 x_{min}(t)}{\partial^2 t} \right| dt \text{ and} \\ w \\ \text{subject to } u(t) \geq 0, v(t) \geq 0, w \geq 0 \\ x_{min}(t) \geq 0 \end{cases} \quad (7)$$

Referring to FIG. 4, according to a preferred embodiment of the method, the deconvolution method is an iterative method which goes beyond iteratively the main noisy components of the noisy measured signal providing thus a final estimate of the input signal, deduced from the final minimal and maximal estimates of the convolution product, which has a very better signal to noise ratio than results obtained by known conventional deconvoluting methods.

For that, the method further comprises a contact point detection step 410 in the course of which at least one point in common, called a contact point, between the noisy measured signal and the minimal estimate of the convolution product and at least one point in common, also called contact point, between the noisy measured signal and the maximal estimate of the convolution product are detected. In the course of the step 400, the minimal and maximal estimates of the convolution product are then computed by going beyond at least one previously detected contact points relative to the minimal estimate, or by going beyond at least one previously detected contact points relative to the maximal estimate or by going beyond all previously detected contact points. The step 400, and 410 are then iterated until a criteria S is verified.

Note that the minimal and maximal estimates are computed using optionally the weighted gap function and that the final estimates of the convolution product may optionally be computed by averaging these minimal and maximal estimates, FIGS. 7a to 7c illustrate the principle of the iterative deconvolution method when the convolution kernel is a one-dimensional rectangular function and the input signal is a Dirac function i.e. a single scalar value.

FIG. 7a illustrates the situation after a first iteration of steps 400 and 410.

Assuming that a minimal estimate $x_{min}(t) \otimes N(t)$ of the convolution product, labelled here 720, has been computed under the constraint that it stays below the noisy measured signal 700 and that such said minimal estimate is in contact with the noisy measured signal 700 at point 721. Note that because the input signal is a Dirac function and the convolution kernel is a rectangular function, a noise free convolution product of the input signal by the convolution kernel is a rectangular function.

Similarly, assuming that a maximal estimate $x_{max}(t) \otimes N(t)$ of the convolution product, labelled here 710, has been computed under the constraint that it stays above the noisy measured signal 700 and that such said maximal estimate is in contact with the noisy measured signal 700 at point 711.

In the course of the step 410, the points of the noisy measured signal 700 corresponding to the points 711 and 721, called the contact points, are then detected from the noisy measured signal 700. A second iteration of steps 400 and 410 is executed. In the course of step 400, a new minimal and a new maximal estimate are computed by going beyond the contact points 711 and 721. Two new contact points 712 and 722 of the noisy measured signal 700 are detected in the step 410 as illustrated in FIG. 7b.

FIG. 7c illustrates the situation after three iterations of the deconvolution method. The new contact points 713 and 723 are depicted, with the corresponding minimal and maximal estimates of the convolution product. In such a situation, it is clear that the two estimates of the convolution product $x(t) \otimes N(t)$ computed at each iteration of the method converge towards the convolution product $x(t) \otimes N(t)$, here labelled 730 and represented in dashed line, like a median calculation. In more complex cases, experience has shown that this method converges also well towards the convolution product of the input signal by the convolution kernel of the sensor device 100.

Now is described the case where the constrained linear system used for estimating the minimal and maximal estimates of the convolution product is digitalised.

In the following, $X_{max}$ called a maximal input vector, is a digitalised version of the maximal estimate $x_{max}(t)$. The maximal estimate of the convolution product $x_{max}(t) \otimes N(t)$ is then a vector matrix product $X_{max} \cdot N$ between a maximal input vector $X_{max}$ and the Toeplitz matrix N. Note that such a maximal estimate is constrained to be an exact convolution product of positive vectors, i.e. $X_{max} \cdot N$ where all the components of are positive values. The maximal vector $X_{max}$ can be deduced from the minimal $X_{min}$ by the following relationship $$X_{max} \cdot N = X_{min} \cdot N + w\Psi$$

where $\Psi$ is a m-length gap vector defined as a digital version of the weighted gap function $w \cdot \psi(t)$. Note that $w \cdot \Psi$ is itself an exact convolution product of positive vectors.

The constrained linear system of equation (6), once digitalized, can then be expressed by equation (5) in which the constraint matrix A is a $(2m \cdot (2m+n+1))$ matrix comprising at least two rows of four blocks each, each of these rows being relative to the computation of either the minimal estimate $X_{min} \cdot N$ or the maximal estimate $X_{max} \cdot N$.

The first block of the first row is the concatenation of a m×n Toeplitz matrix N the components of which are defined by the convolution kernel of the sensor device 100. The second block of the first row is a m×m identity matrix $I_1$ the components of which are equal to 0 except the diagonal ones which are equal to 1, the third block of the first row is a m×m null matrix $I_0$ all the components of which are equal to 0 and the fourth block is a m-length vector all the components of which are equal to 0.

The first block of the second row of the constraint matrix A is the m×n Toeplitz matrix N. The second block of the second row is a m×m null matrix $I_0$. The third block of the second row is a m×m identity matrix $I_{-1}$ the components of which are equal to 0 except the diagonal ones which are equal to -1. The fourth block of the second row is a m-length vector the components of which are equal to the components of the gap vector $\Psi$.

Preferably, the m components of the gap vector $\Psi$ are defined by summing the columns values of the Toeplitz matrix N as illustrated in FIG. 8a-c.

In FIG. 8a is represented a 3×9 (n=3 and m=9) transposed Toeplitz matrix N the non zero components of which are all equal to 3. Note that this is just an example of Toeplitz matrix which does not restrict the scope of the invention in which Toeplitz matrix of any m×n dimensions containing any integer or real values may be used.

FIG. 8b gives the set of digitalized values {3, 6, 9, 9, 9, 6, 3} which are the components of the gap vector $\Psi$ and FIG. 8c gives a graphical aspect of an example of the gap function. Such a defined gap function is an exact convolution product of positive vectors which present faint value at their extremities where the absolute noise contribution to measured signal is usually fainter in a Poisson noise model.

The vector B of the constrained linear system of equation (5) is a (m+m)-length vector the first m components of which are equal to the components of the noisy measured vector Y and the last m components of which are equal to the component of the noisy measured vector Y.

The vector Z of the constrained linear system of equation (5) is a (2m+n+1)-length vector the first n components of which are the n components of the minimal input vector $X_{min} \cdot N$ the m following components of which are the m components of the deviation vector U the components of which are the deviations between the minimal estimate $X_{min} \cdot N$ and the noisy measured vector Y and the m following components of which are the m components of the deviation vector V the components of which are the deviations between the maximal estimate $X_{max} \cdot N$ and the noisy measured vector Y and last component of which is the weighting value w constrained to remain a positive value.

The cost vector C is chosen to minimize the deviation vectors U and V and the weighting value w and to maintain the maximal and the minimal estimates of the input signal to be positive. The cost vector C is then a (2m+n+1)-length vector the first n components being equal to 0, the other components being equal to 1.

The constrained linear system $A \cdot Z = B$ is then given by $$\begin{bmatrix} N & I_1 & I_0 & 0 \\ N & I_0 & I_{-1} & \psi \end{bmatrix} \begin{bmatrix} X_{min} \\ U \\ V \\ w \end{bmatrix} = \begin{bmatrix} Y \\ Y \end{bmatrix}$$

Optimising such a constrained linear system allows the minimization of the deviation vectors U and V and insures that at least one component of the deviation vector U and at least one component of the deviation vector U equal to 0 after such an optimisation. Moreover, the minimisation of the weighting coefficient w insures the convergence of the minimal and maximal estimates towards a median solution.

An example of the constraint matrix A of such a constrained linear system is given by equation (7) for illustrative purpose in the case where n=5 and m=7.

$$\begin{bmatrix} 3 & & & & & 1 & & & & & & 0 \\ 3 & 3 & 0 & & & & 1 & & & & & 0 \\ 3 & 3 & 3 & & & & & 1 & & & & 0 \\ & 3 & 3 & 3 & & & & & 1 & & & 0 \\ & & 3 & 3 & 3 & & & 1 & & 0 & & 0 \\ & & 0 & 3 & 3 & & 0 & & 1 & & & 0 \\ & & & & 3 & & & & 1 & & & 0 \\ 3 & & & & & & & -1 & & & & 3 \\ 3 & 3 & 0 & & & & & & -1 & & & 6 \\ 3 & 3 & 3 & & & & & & & -1 & & 9 \\ & 3 & 3 & 3 & & & & & & & -1 & 9 \\ & & 3 & 3 & 3 & & 0 & & & & -1 & 9 \\ & & 0 & 3 & 3 & & & & & & -1 & 6 \\ & & & & 3 & & & & & & -1 & 3 \end{bmatrix}$$

According to a variant, the constraint matrix A further comprises at least one matrix Id, called a derivative matrix, intended to introduce a smoothing constraint on the minimal and maximal estimates.

Introducing smoothing constraints (equation (7)), two new blocks rows are added to the constraints matrix A. The first block of the two new rows is the derivative matrix Id.

The constrained linear system in matrix form is then given by $$\begin{bmatrix} N & I_1 & I_0 & 0 & 0 & 0 \\ N & I_0 & I_{-1} & \Psi & 0 & 0 \\ I_d & 0 & 0 & 0 & I_1 & 0 \\ I_d & 0 & 0 & 0 & 0 & I_{-1} \end{bmatrix} \begin{bmatrix} X_{min} \\ U \\ V \\ w \end{bmatrix} = \begin{bmatrix} Y \\ Y \end{bmatrix}$$

A derivative matrix Id is either a (n×(n−1)) first derivative matrix $I_{d1}$ used for computing the first derivative of n data or a (n×(n−2)) second derivative matrix $I_{d2}$ used for computing the second derivatives of n data.

As for an example, when n=5, a (5×4) matrix $I_{d1}$ is given by $$I_{d1} = \begin{bmatrix} -1 & 1 & 0 & 0 & 0 \\ 0 & -1 & 1 & 0 & 0 \\ 0 & 0 & -1 & 1 & 0 \\ 0 & 0 & 0 & -1 & 1 \end{bmatrix}$$

And a (5×3) second derivative matrix $I_{d2}$ is given by $$\begin{bmatrix} -1 & 2 & -1 & 0 & 0 \\ 0 & -1 & 2 & -1 & 0 \\ 0 & 0 & -1 & 2 & -1 \end{bmatrix}$$

According to an embodiment of step 400, a contact point is preferably gone beyond when a component of the deviation vector U or V is null, when the weighting value w does not equal to 0 and ensuring that the vectors U and V do not exhibit null components at the same position.

Thus, when a component $v_i$, having the number i, of the deviation vector V is null and a component $u_j$, having the position j, of the deviation vector U is also null, the contact (7)

point relative to each of these component is gone beyond only if i≠j because if i=j the contact point is a point of the median estimate.

Moreover, when the weighting coefficient w is null, that means that the minimal estimate equals to the maximal estimate and thus the ideal convolution product is found.

According to an embodiment of the step 410, the sign of the deviation of the equality constraint of the constrained linear system corresponding to each contact point to go beyond is reversed.

For example, assuming the constraint matrix A of the constrained linear system given in equation (7) and that in the course of the step 410 only the third component of the deviation vector U is null, the component located at the intersection between the third column and the third row of the matrix $I_1$ becomes equal to −1 and the corresponding component of the cost vector C is set to 0. In that way, at the next iteration of the method, the deviation component $u_3$, which is now a negative value, will impose that the new minimal estimate is up the component $u_3$ of the contact point.

Alternatively, in the course of the step 410, the elements of the constrained linear system relative to a contact point to go beyond are removed reducing then the dimensions of the constrained linear system and then its computation time.

Following the previous example, a null component of the deviation vector U being relative to the third row and third column of the identity matrix $I_1$ then the third row and the (n+3) column of the matrix A, the third component of the deviation vector U, the third component $y_3$ of the vector B and the (n+3) component of the cost vector C are removed.

At each iteration of steps 400 and 410, at least one column and one row are removed from the matrix A. The constrained linear system being highly overdetermined because the vector B is composed of twice the measured vector Y, several lines and columns can be removed with no harm. However, the underdetermination of the constrained linear system shall be avoided by limiting the number of gone beyond contact points.

According to an embodiment of the method, the criteria S is verified when either the number of iterations is equal to a predefined number of iterations or when the cumulative number of gone beyond contact points over successive iterations is greater than a predefined threshold, or, preferably, when the weighting value w has a null value, i.e. when the minimal estimate equals to the maximal estimate. When the criteria S is verified and the minimal and maximal estimates are not the same, the final estimate is the average of the minimal and maximal estimates.

The above-described preferred embodiment of the deconvolution method allows to get a high signal to noise ratio estimate of the input signal from a signal which is measured by a sensor device having a single response function.

It is well-known that when the sensor device provides from a same input signal multiple different measured signals each being represented as a sum of a noise with a convolution product of the input signal by a different convolution kernel, computing an estimate of the input signal from the combined deconvolution of all these measured signals together improves the signal to noise ratio of the estimate of the input signal. This is usually called the multichannel technique (C. Berenstein, E. V. Patrick Exact deconvolution for multiple convolution operators, Proc IEEE 1990 78 p 723-734).

According to a variant of the iterative deconvolution method, the noisy measured vector Y being formed from K noisy measured vectors $Y_k$ corresponding each to a sum of a noise with a convolution product of a same input signal by a specific convolution kernel expressed as a Toeplitz matrix $N_k$, the constraint matrix A is defined by the concatenation of K pairs of two rows.

The first column of the matrix A is fed by 2×K Toeplitz matrices $N_k$ and the other columns of the matrix A are fed with 0 except one block of the first row of each pair which is fed with an identity matrix and one block of the second row of each pair which is fed with a negative identity. Moreover one column of the second row of the pair is fed with a m-length vector the components of which are equal to the components of the gap vector $\Psi$. All the non zero block may be on the almost diagonal.

FIG. 9 shows an example of the form of the constraint matrix A of the constrained linear system when K=2. The constraint matrix A is composed of two pairs of two rows of seven blocks each.

About the first pair of rows, the first block of the first row 900 and the first block of the second row 920 are the Toeplitz matrix $N_1$ formed from one of the two response functions of the sensor device 100. The second block of the first row 910 is the diagonal identity matrix $I_1$ which links the deviation between the minimal estimate $X_{min} \cdot N_1$ and the noisy measured vector $Y_1$. The third block of the second row 930 is the diagonal identity matrix $I_{-1}$ which links the deviation between the maximal estimate $X_{max} \cdot N_1$ and the noisy measured vector $Y_1$. The fourth block of the second row 940 is a column vector comprising the gap vector $\Psi$. The other blocks of the first and second row are all null blocks i.e. all their components equal to 0.

About the second pair of rows, the first block of the first row 950 and the first block of the second row 970 are the Toeplitz matrix $N_2$ formed from the other response function of the sensor device 100. The fifth block of the first row 960 is the diagonal identity matrix $I_1$ which links the deviation between the minimal estimate $X_{min} \cdot N_2$ and the noisy measured vector $Y_2$. The sixth block of the second row 980 is the diagonal identity matrix $I_{-1}$ which links the deviation between the maximal estimate $X_{min} \cdot N_2$ and the noisy measured vector $Y_2$. The seventh block of the second row 990 is a column vector comprising the gap vector $\Psi$. The other blocks of the first and second row are all null blocks i.e. all their components equal to 0.

The vector B of the constrained linear system is composed by the concatenation of $B_k$ vectors where each vector $B_k$ is the concatenation of the noisy measured vectors $Y_k$ repeated twice.

The vector Z of the constrained linear system is composed of the minimal input vector $X_{min}$ followed by K pairs of vectors. The first vector of each pair is fed with a deviation vector $U_k$ between the minimal estimate $X_{min} \cdot N_k$ and the noisy measured vector $Y_k$, and the second vector of each pair is fed with the deviation vector $V_k$ between the maximal estimate $X_{max} \cdot N_k$ and the noisy measured vector $Y_k$. The K $w_k$ are weighting coefficients which measure the distance between the corresponding minimal and maximal estimates. These weighting coefficients are added to the vector Z.

The cost vector C is defined by a vector which components are equal to 1 except the n first components which are equal to 0.

The inventor observed that the detected contact points are mainly relative to noise components but sometimes some detected contact points do not match a noisy component. For example, positive components of noise are sometimes wrongly attributed to negative noise components. Note that the percentage of errors is small but it increases with the number of iterations and with the number of gone beyond contact points. In the same manner allowing the removal of a lot of constraints may increase the percentage of errors. Thus a compromise exists between the accuracy of the method and the rapidity of its execution.

To remedy this problem, several criteria can be associated to reinforce the contact point criterion.

For example, the inventor observed that a strong negative component of the noise is almost always associated with a strong value of the second derivative of the noisy measure signal y(t) at that point. On the contrary a strong positive component of the noise is associated with a negative value of the second derivative of the noisy measured signal y(t).

Then, according to an embodiment of the method, a contact point to go beyond is a point with the maximum value of the second derivative at that point when the deviation equals to 0. For example, a contact point to go beyond relative to a minimal estimate verifies at least the following constraints $$\begin{cases} \text{go beyond } y(t_i) - \\ \text{if } u(t_i) = y(t_i) - x_{min}(t) \otimes N(t_i) = 0 \\ \text{and} \\ y''(t_i) \text{ maximum} \end{cases}$$

where $y(t_i)$—means discarding the constraint of inferiority $x_{min} \otimes N(t_i) \leq y(t_i)$ at the point $t_i$.

Choosing to go beyond all the contact points with u(t)=0 leads to a small percentage of errors. Then, it may be also advantageous to relax the criteria in order to speed up the process. Then, according to a variant, a contact point to go beyond is a point with the value of the second derivative at that point greater than or equal to a constant value $\epsilon$ when the deviation is lower than or equal to another constant value $\gamma$. For example, a contact point to go beyond relative to a minimal estimate verifies at least the following constraints $$\begin{cases} \text{go beyond } y(t_i) - \\ \text{if } u(t_i) = y(t_i) - x_{min}(t) \otimes N(t_i) \leq \gamma \\ \text{and} \\ y''(t_i) \geq \varepsilon \end{cases}$$

This approach allows by lowering the constants γ or ε to increase the importance of either criteria.

A last criteria can be added to the first two ones. An inverse filter may be built from any convolution kernel N(t).

FIG. 10 shows a typical inverse filter built from a rectangle kernel N(t) of width L. The inverse filter comprises a succession of positive and negative Dirac impulses which are symmetrically located from the centre of the filter O. As shown in FIG. 10, the centre O is surrounded by Dirac impulses of period L, at the exception of the central gap which is L−1 for the positive impulses and L+1 for the negative impulses. The convolution of this inverse filter by a rectangle kernel of width L gives a Dirac impulse. This can be easily understood: the shorter central gap makes the rectangle functions collide and built the central impulse of the response. Then, the negative impulses tend to annihilate the remaining effects of the positive impulses. It has been observed that the convolution product of a minimal estimate $x_{min}(t)$ by the inverse filter of the convolution kernel N(t) exhibits a maximum at the exact place of the main positive or negative noise components. This is due to the fact that the noise produces a strong effect on the solution which takes an aspect similar to the inverse filter and that the autocorrelation of the inverse filter approaches a maximum peak. Let be the inverse filter, this property can be mixed with the contact criteria to improve the detection of the noise. Then, a contact point to go beyond relative to a minimal estimate verifies at least the following constraints $$\begin{cases} \text{go beyond all } y(t_i) - \\ \text{if } u(t_i) = y(t_i) - x_{min} \otimes N(t_i) \leq \gamma \text{ and} \\ x_{min}(t) \otimes \chi(t_i) \geq \sigma \end{cases}$$

It is then straightforward for the skilled in the art that all the three criteria can be mixed together with various importance depending on the boundary of the inequalities choose.

FIG. 11 is a diagram representing the architecture of an apparatus in which the present invention is implemented.

The apparatus 1100 is preferably embedded in the computing device 120 of the acquisition system shown in FIG. 1, but it may be also embedded in the sensor device 100.

The apparatus 1100 has, for example, an architecture based on components connected together by a bus 1101 and a processor 1102 controlled by the programs as disclosed in FIG. 4.

The bus 1101 links the processor 1102 to a read only memory ROM 1103, a random access memory RAM 1104, an I/O interface 1105 and a mass memory 1106 which may be an external disk. The processor 1102 controls the operation of the I/O interface 1105.

The apparatus may be connected to a telecommunication network not shown in FIG. 11 through the I/O interface 1105. For example, the I/O interface 1105 is a DSL (Digital Subscriber Line) modem, an ISDN (Integrated Services Digital Network) interface, or an Ethernet interface, etc. Moreover, the I/O interface 1105 allows to display the computed minimal and maximal estimates of the convolution product, the final estimate of the convolution product and the final estimate of the input signal.

Through the I/O interface 1105, the apparatus 1100 may receive either the noisy measured signal y(t) which is then digitalised or directly a m-length noisy measured vector Y.

The memory 1103 contains instructions of the programs related to the methods as disclosed in FIG. 4 and a digitalised version of the convolution kernel N(t) expressed in a Toeplitz matrix form.

The memory 1106 may comprise the in-length noisy measured vector Y.

When the apparatus 1100 is powered on, the instructions of the programs and the Toeplitz matrix N stored on memory 1103, are transferred to the memory 1104 which contains registers intended to receive variables of the transferred instructions of the programs.

The memory 1104 comprises also the m-length noisy measured vector Y, optionally transferred from the memory 1106 or obtained on the fly from the sensor device 100 via the I/O interface 1105. The memory 1104 comprises also the computed minimal and maximal estimates of the convolution product, the final estimate of the convolution product and optionally the final estimate of the input signal.

Optionally, the final estimate of the convolution product and the final estimate of the input signal are stored on the memory 1106 once computed.

The invention claimed is:

1. A method for estimating an input signal (x(t)) representative of a feature of physical quantity measured by a sensor device (100), said sensor device (100) having a response function described by an a priori known convolution kernel (N(t)) and outputting a noisy measured signal (y(t)) which is considered as the sum of, in one hand, the convolution product (x(t)⊗N(t)) of said input signal (x(t)) and said convolution kernel (N(t)) and, in the other hand, a noise (no) which interferes with the measure, said method being carried out by deconvoluting said noisy measured signal (y(t)),
characterised in that said method comprises an estimate computation step (400) including
computing of a minimal estimate of the convolution product of the input signal ($x_{min}(t)$) by the convolution kernel (N(t)) of the sensor device (100) in order that said minimal estimate is lower than or equal to the noisy measured signal (y(t)),
computing of a maximal estimate of the convolution product of the input signal by the convolution kernel of the sensor device in order that said maximal estimate is greater than or equal to the noisy measured signal (y(t)), and
computing of a final estimate of the convolution product as being the average of said minimal and maximal estimates of the convolution product, and
a deconvolution step for deconvolving said final estimate of the convolution product in order to estimate the input signal (x(t)).

2. Method according to claim 1, wherein said minimal and maximal estimates of the convolution product are computed by optimising a constrained linear system which contains at least the following constraints $$\begin{cases} \text{Minimize } u(t) = y(t) - x_{min}(t) \otimes N(t) \\ v(t) = x_{max}(t) \otimes N(t) - y(t) \\ u(t) \geq 0 \text{ et } v(t) \geq 0 \\ \text{and } x_{min}(t) \geq 0 \text{ and } x_{max}(t) \geq 0 \end{cases}$$

where y(t) is the noisy measured signal, $x_{min}(t)$⊗N(t) is the minimal estimate of the convolution product, $x_{max}(t)$ ⊗N(t) is the maximal estimate of the convolution product, u(t) is the deviation between said minimal convolution product and the noisy measured signal y(t), v(t) is the deviation between said maximal convolution product and the noisy measured signal y(t), $x_{min}(t)$ is the minimal estimate of the input signal and $x_{max}(t)$ is the maximal estimate of the input signal.

3. Method according to claim 1, wherein the maximal and minimal estimates of the convolution product are separated by a weighted gap function w·ψ(t) measuring the distance between the minimal and maximal estimates of the convolution product so that the maximal estimate of the convolution product is deduced from the minimal estimate of the convolution product by the following relation:

$$x_{max}(t) \otimes N(t) = x_{min}(t) \otimes N(t) + w \cdot \psi(t)$$

wherein w is a positive scalar value.

4. Method according to claim 3, wherein the constrained linear system contains at least the following constraints $$\begin{cases} \text{Minimize } u(t) = y(t) - x_{min}(t) \otimes N(t) \\ \text{and } v(t) = x_{min}(t) \otimes N(t) + w \cdot \psi(t) - y(t) \\ \text{and } w \\ \text{subject to } u(t) \geq 0, v(t) \geq 0, w \geq 0 \\ \text{and } x_{min}(t) \geq 0 \end{cases}$$

where ψ(t) is the gap function between said minimal and maximal estimates of the convolution product, w is a positive scalar value and the maximal estimate of the convolution product is deduced from the minimal estimate of the convolution product by the following relation $$x_{max}(t) \otimes N(t) = x_{min}(t) \otimes N(t) + w \cdot \psi(t).$$

5. A method according to claim 4, wherein a smoothing constraint is introduced on said minimal and maximal estimates of the input signal, the constrained linear system contains then at least the following constraints $$\begin{cases} \text{Minimize } u(t) = y(t) - x_{min}(t) \otimes N(t) \\ \text{and } v(t) = x_{min}(t) \otimes N(t) + w \cdot \psi(t) - y(t) \\ \text{and } \int \left| \frac{\partial x_{min}(t)}{\partial t} \right| dt \text{ or } \int \left| \frac{\partial^2 x_{min}(t)}{\partial^2 t} \right| dt \\ \text{and } w \\ \text{subject to } u(t) \geq 0, v(t) \geq 0, w \geq 0 \\ x_{min}(t) \geq 0 \end{cases}$$

6. Method according to claim 1, the sensor device providing from a same input signal multiple different measured signals each being represented as a sum of a noise with a convolution product of the input signal by a different convolution kernel, wherein the estimate of the input signal is computed from the combined deconvolution of all these measured signals together.

7. A method according to claim 2, wherein the method further comprises a contact point detection step (400) in the course of which
at least one point in common, called a contact point, between the noisy measured signal (y(t)) and the minimal estimate ($x_{min}(t) \otimes N(t)$) of the convolution product and at least one point in common, also called contact point, between the noisy measured signal (y(t)) and the maximal estimate ($x_{max}(t) \otimes N(t)$) of the convolution product are detected, and wherein
the estimate computation step and the contact point detection step are iterated until a criteria (S) is verified,
at each iteration, in the course of the estimate computation step (400), the minimal and maximal estimates of the convolution product being computed by going beyond at least one previously detected contact points relative to the maximal estimate or by going beyond all previously detected contact points,
a contact point being preferably gone beyond when one component of the deviation u(t) or v(t) is null, when the weighting coefficient (w) does not equal to 0 and ensuring that the deviation u(t) and v(t) do not exhibit null components at the same position.

8. Method according to claim 7, wherein the criteria (S) is verified
when the number of iterations is equal to a predefined number of iterations, or
when the cumulative number of either the sign of the inequality constraint of the constrained linear, or groups of elements of the constrained linear system relative each to a contact point, over successive iterations is greater than a predefined threshold, or
when the minimal estimate equals the maximal estimate or, preferably,
when the scalar (w) has a null value.

9. Method according to claim 7, wherein a contact point which corresponds to an inequality constraint of the constrained linear system the sign of which is reversed or which corresponds to elements of the constrained linear system which are removed is a point with the value of the second derivative at that point greater than or equal to a constant value (ε) when the deviation is lower than or equal to another constant value (γ).

10. Method according to claim 2, wherein a contact point relative to a minimal estimate and to an inequality constraint of the constrained linear system the sign of which is reversed or to elements of the constrained linear system which are removed, verifies at least the following constraints $$\begin{cases} u(t_i) = y(t_i) - x_{min} \otimes N(t_i) \leq \gamma \\ \text{and } x_{min}(t) \otimes \chi(t_i) \geq \sigma \end{cases}$$

χ is an inverse filter built from the convolution kernel of the sensor device, y(ti) is y(t) at a point ti, $x_{min}(t)$ is the minimal estimate of the input signal, N(t) is the convolution kernel defined by the response function of the sensor device (100), γ is a constant value.

11. An apparatus for estimating an input signal (x(t)) representative of a feature of physical quantity measured by a sensor device (100), said sensor device (100) having a response function described by an a priori known convolution kernel (N(t)) and outputting a noisy measured signal (y(t)) which is considered as the sum of, in one hand, the convolution product (x(t)⊗N(t)) of said input signal (x(t)) and said convolution kernel (N(t)) and, in the other hand, a noise (no) which interferes with the measure, said method being carried out by deconvoluting said noisy measured signal (y(t)),
characterised in that said apparatus comprises:
a process configured to:
compute a minimal estimate of the convolution product of the input signal (Xmin(t)) by the convolution kernel (N(t)) of the sensor device (100) in order that said minimal estimate is lower than or equal to the noisy measured signal (y(t)),
compute of a maximal estimate of the convolution product of the input signal by the convolution kernel of the sensor device in order that said maximal estimate is greater than or equal to the noisy measured signal (y(t)), and compute of a final estimate of the convolution product as being the average of said minimal and maximal estimates of the convolution product, and deconvolute said final estimate of the convolution product in order to estimate the input signal (x(t)).

12. Apparatus according to claim 11, where said minimal and maximal estimates of the convolution products are computed by optimising a constrained linear system which contains at least the following constraints $$\begin{cases} \text{Minimize } u(t) = y(t) - x_{min}(t) \otimes N(t) \\ v(t) = x_{max}(t) \otimes N(t) - y(t) \\ u(t) \geq 0 \; et \; v(t) \geq 0 \\ \text{and } x_{min}(t) \geq 0 \text{ and } x_{max}(t) \geq 0 \end{cases}$$

where y(t) is the noisy measured signal $x_{min}(t) \otimes N(t)$ is the minimal estimate of the convolution product, $x_{max}(t) \otimes N(t)$ is the maximal estimate of the convolution product, u(t) is the deviation between said minimal convolution product and the noisy measured signal y(t), v(t) is the deviation between said maximal convolution product and the noisy measured signal $z_{min}(t)$ is the minimal estimate of the input signal and $x_{max}(t)$ is the maximal estimate of the input signal.

13. Apparatus according to claim 12, wherein the processor further configured to detect contact point (400) in the course of which at least one point in common, called a contact point, between the noisy measured signal (y(t) and the minimal estimate $x_{min}(t) \in N(t)$ of the convolution product and at least one point in common, also called contact point, between the noisy measured signal (y(t) and the maximal estimate $x_{min}(t) \in N(t)$ of the convolution product are detected, and wherein the estimate computation step and the contact point detection step (400) are iterated until a criteria (S) is verified, at each iteration, in the course of the estimate computation step (400), the minimal and maximal estimates of the convolution product being computed by going beyond at least one previously detected contact points relative to the maximal estimate or by going beyond all previously detected contact points, a contact point being preferably gone beyond when one component of the deviation u(t) or v(t) is null, when the weighting coefficient (w) does not equal to 0 and ensuring that the deviation u(t) and v(t) do not exhibit null components at the same position.

* * * * *